United States Patent Office 3,454,636
Patented July 8, 1969

3,454,636
BENZENESULFONYL-UREAS AND PROCESS
FOR THEIR MANUFACTURE
Walter Aumüller, Kelkheim, Taunus, Helmut Weber,
Frankfurt am Main, Karl Muth, Kelkheim, Taunus,
Rudi Weyer, Frankfurt am Main, and Felix Helmut
Schmidt, Mannheim-Neuostheim, Germany, assignors to
Farbwerke Hoechst Aktiengesellschaft vormals Meister
Lucius & Brüning, Frankfurt am Main, Germany, a
corporation of Germany
No Drawing. Filed Mar. 8, 1966, Ser. No. 532,567
Claims priority, application Germany, Mar. 24, 1965,
F 45,611
Int. Cl. C07c 127/12
U.S. Cl. 260—553          7 Claims

ABSTRACT OF THE DISCLOSURE

Benzene-sulfonyl ureas and physiologically tolerable salts thereof having hypoglycemic activity and the formula:

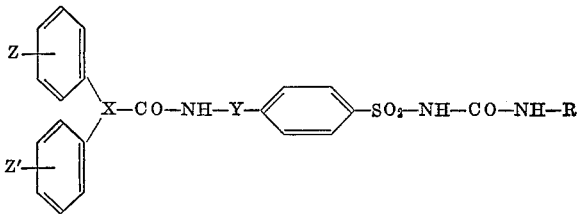

in which:
R represents (a) alkyl or alkenyl having 2 to 8 carbon atoms, (b) phenyl-lower alkyl, (c) cyclohexyl-lower alkyl, (d) endoalkylene-cyclohexyl, endoalkylene-cyclohexenyl, endoalkylene-cyclohexylmethyl or endoalkylene-cyclohexenylmethyl having 1 to 2 endoalkylene carbon atoms, (e) lower alkylcyclohexyl or lower alkoxycyclohexyl, (f) cycloalkyl having 5 to 8 carbon atoms, (g) cyclohexenyl or cyclohexenylmethyl,
Z, Z' represent halogen, lower alkyl or lower alkoxy,
X represents a saturated or unsaturated hydrocarbon radical having 2 carbon atoms,
Y represents an alkyl chain having 1 to 3 carbon atoms.

---

The present invention provides benzenesulfonyl-ureas of the formula

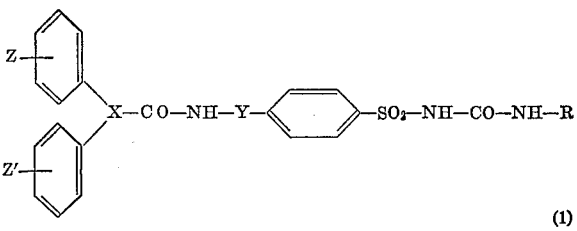

(1)

in which:
R represents (a) alkyl, alkenyl having 2 to 8 carbon atoms, (b) lower phenyl-alkyl, (c) lower cyclohexyl-alkyl, (d) endoalkylene-cyclohexyl, endoalkylene-cyclohexenyl, endoalkylene-cyclohexylmethyl or endoalkylene-cyclohexenylmethyl having 1 to 2 endoalkylene carbon atoms, (e) lower alkylcyclohexyl, lower alkoxy-cyclohexyl, (f) cycloalkyl having 5 to 8 carbon atoms, (g) cyclohexenyl, cyclohexenylmethyl,
Z, Z' represent halogen, lower alkyl or lower alkoxy,
X represents a saturated or unsaturated hydrocarbon radical containing 2 carbon atoms,
Y represents an alkyl chain having 1 to 3 carbon atoms, and salts of the said benzenesulfonyl-ureas.

The term "lower alkyl" is used through the specification to mean an alkyl radical containing 1 to 4 carbon atoms in a straight or branched chain.

In correspondence with the definition given above, R may represent, for example, ethyl, propyl, isopropyl, butyl, isobutyl, sec. butyl, straight chain or branched chain amyl (pentyl), hexyl, heptyl or octyl; furthermore, radicals which correspond to the afore-mentioned hydrocarbon radicals and which contain an ethylenic double linkage such allyl or crotyl, and furthermore benzyl, α-phenyl-ethyl, β-phenyl-ethyl, α-, β- or γ-phenylpropyl or phenyl-butyls.

Especially advantageous are those compounds which contain, as the group represented by R, a cycloaliphatic hydrocarbon group which may be substituted by an alkyl or alkoxy radical or linked to the nitrogen atom by means of an alkylene radical. Such groups comprise, for example, cyclopentyl, cyclohexyl, cycloheptyl, cyclooctyl, methyl-cyclo-hexyl, ethyl-cyclohexyl, propyl- and isopropyl-cyclohexyl, methoxy-cyclohexyl, ethoxy-cyclohexyl, propoxy- and isopropoxy-cyclohexyl; the alkyl or alkoxy groups are preferably in 4-position, in the cis- or trans-configuration. Furthermore, there may be mentioned cyclohexylmethyl, α- or β-cyclohexylethyl, endomethylene-cyclohexyl (2,2,1-bicycloheptyl), endoethylene-cyclohexyl (2,2,2-bicyclooctyl), endomethylene-cyclohexenyl, endoethylene-cyclohexenyl, endomethylene-cyclohexylmethyl, endoethylene-cyclohexylmethyl, endomethylene-cyclohexenylmethyl or endoethylene-cyclohexenylmethyl.

X represents a saturated or unsaturated hydrocarbon radical containing 2 carbon atoms and which may be substituted by 2 phenyl radicals which themselves may carry substituents such as fluorine, chlorine, bromine, lower alkyl or lower alkoxy. The phenyl radicals may be bound to be the same carbon atom or to different carbon atoms of the radical X.

The alkyl chain represented by Y may be a straight or a branched chain.

The benzenesulfonyl-ureas of the present invention can be prepared by methods which are generally used for the preparation of compounds of this class. Thus, they can be prepared by (a) Reacting a benzenesulfonyl isocyanate, benzenesulfonyl carbamic acid ester, benzenesulfonyl thiocarbamic acid ester, benzenesulfonyl carbamic acid halide or benzenesulfonyl-urea carrying the substituent

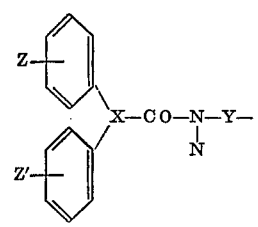

with an amine of the formula RNH₂ or with a salt thereof, or (b) Reacting a benzenesulfonamide or its salt carrying the substituent

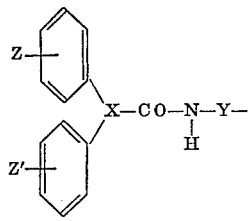

with an R-substituted isocyanate, carbamic acid ester, thiocarbamic acid ester, carbamic acid halide or urea, or (c) Reacting a benzenesulfonyl chloride carrying the substituent

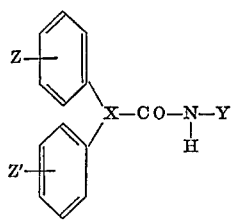

with an R-substituted urea, isourea ether, isothiourea ether or parabanic acid and hydrolysing the benzenesulfonyl-isourea ether, benzenesulfonylisothiourea ether or benzenesulfonyl-parabanic acid obtained in this way or by another method, or (d) Replacing the sulfur atom in a correspondingly substituted benzenesulfonyl-thiourea by an oxygen atom, or (e) Oxidizing a correspondingly substituted benzenesulfenyl urea or benzenesulfinyl urea, or (f) Introducing the radical

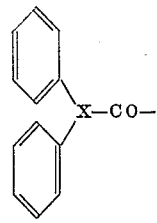

by acylation in one or several reaction stages into a benzenesulfonyl urea of the formula

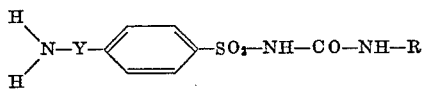

and, if desired, converting a resulting free compound into a salt thereof by treatment with an alkaline agent.

Depending on the nature of the groups X and R, there may be some cases where one or other of the above-mentioned processes is less suitable for the preparation of individual compounds which correspond to Formula 1, or at least, where measures for the protection of the active groups are required. Such cases, however, which are relatively rare, can easily be recognized by the expert who will have no difficulty in successfully using another of the above-described methods.

The benzenesulfonyl-carbamic acid esters or benzenesulfonyl thiocarbamic acid esters may carry in the alcohol component a low molecular weight alkyl group or a phenyl group. The same applies to the R-substituted carbamic acid esters or the corresponding monothiocarbamic acid esters.

As carbamic acid halides, the chlorides are advantageously used.

The benzenesulfonyl-ureas used as starting substances in the process of the present invention may be unsubstituted at the side of the urea molecule opposite to the sulfonyl group or may be mono- or di-substituted, preferably by low molecular weight alkyl or aryl radicals; the aryl groups may be linked with one another by a chemical bond or by means of bridging members such, for example, as —CH₂—, —NH—, —O— or —S—. Instead of benzenesulfonyl-ureas substituted in such manner, there may also be used corresponding N-benzenesulfonyl-N'-acyl ureas, which in addition may be alkylated or arylated at the N'-nitrogen atom, and even bis-(benzenesulfonyl)-ureas. Such bis-(benzenesulfonyl)-ureas or N-benzenesulfonyl-N'-acyl ureas may be treated, for example, with RNH₂ amines.

It is also possible to start from a urea of the formula R—NH—CO—NH₂ or from an acylated urea of the formula R—NH—CO—NH-acyl, in which acyl represents a preferably low molecular weight aliphatic or aromatic acid radical or a nitro group or from a phenyl urea of the formula R—NH—CO—NH—C₆H₅ or from diphenyl ureas of the formula R—NH—CO—N(C₆H₅)₂, in which the phenyl groups may be substituted and may be linked with one another directly or by means of a bridge member such, for example, as —CH₂—, —NH—, —O— or —S—, or from an N,N'-di-substituted urea of the formula

R—NH—CO—NH—R and to react the said compound with a benzenesulfonamide containing a substituent of the formula

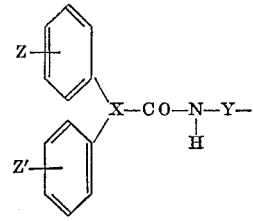

In the correspondingly substituted benzenesulfonyl-thio-ureas, the sulfur atom can be replaced by an oxygen atom, for example, with the aid of oxides or salts of heavy metals or by the use of oxidizing agents such, for example, as hydrogen peroxide, sodium peroxide or nitrous acid. The thioureas can likewise be desulfurized by treatment with phosgene or phosphorus pentachloride. Chloroformic acid amidines or chloroformic acid carbodiimides obtained as intermediates can be converted into the benzenesulfonyl-ureas by an appropriate treatment, for example, by hydrolysis or the addition of water.

In regard to the reaction conditions, the manner of carrying out the process of the present invention may, in general, vary within wide limits and can be adapted to each individual case. For example, the reactions can be carried out with the use of solvents, at room temperature or at an elevated temperature.

As starting substances, there may be used compounds which contain a benzene radical which is substituted by the group

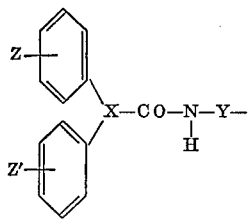

Examples of the component

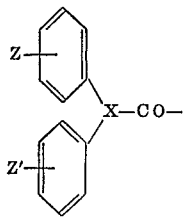

of the afore-indicated formula are:

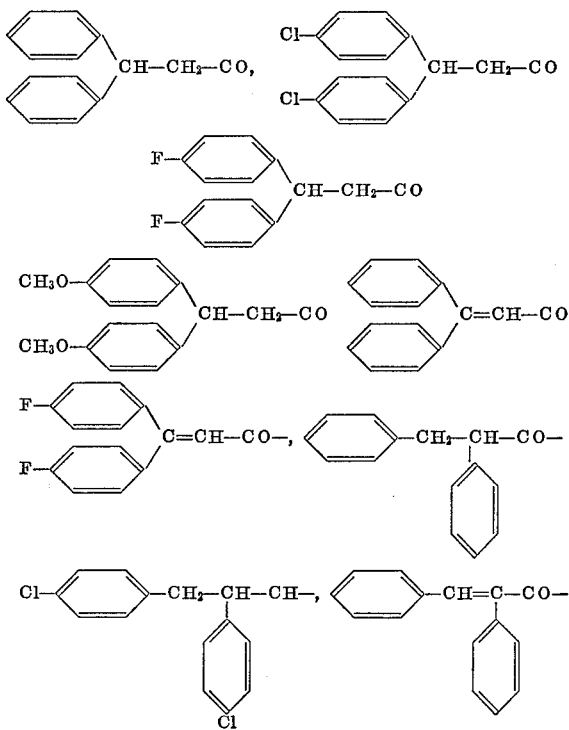

The benzenesulfonyl-urea derivatives obtained by the process of the present invention are valuable medicaments which are distinguished by a strong and long lasting hypoglycemic action. Their blood sugar lowering action can be ascertained by feeding them, for example, to rabbits in a dose of 10 milligrams/kilogram of body weight and determining the blood sugar value according to the known method of Hagedorn-Jansen or by means of an autoanalyser.

Thus, it has been found that N-[4-($\beta$-<$\beta,\beta$-diphenyl-propionamido>-ethyl) - benzenesulfonyl] - N' - n-butyl-urea provokes after 3 hours a lowering of the blood sugar of 26% and that N-[4-($\beta$-<$\beta,\beta$-diphenyl-propionamido>-ethyl)-benzenesulfonyl]-N'-(4-methyl-cyclohexyl) - urea provokes a lowering of the blood sugar of 32%. In contradistinction thereto, 6-(4-methyl-benzenesulfonyl)N'-butyl-urea which is known as an oral antidiabetic, has no blood sugar lowering effect when fed to rabbits in the indicated dose of 10 mg./kg. A blood sugar reaction can be observed at doses of 25 mg./kg. and more.

The strong hypoglycemic action of the compounds of the present invention becomes more evident when the dose is further reduced. When N-[4-($\beta$-<$\beta,\beta$-diphenyl-propionamido>-ethyl]-benzenesulfonyl]-N'-(4 - methyl-cyclohexyl)-urea is administered to a rabbit in a dose of 0.4 mg./kg., a distinct lowering of the blood sugar can still be observed.

The benzenesulfonyl-ureas described are preferably used for the manufacture of pharmaceutical preparations for oral administration and lowering the blood sugar level in the treatment of diabetes mellitus and may be used as such or in the form of their physiologically tolerable salts or in the presence of substances which cause such salt formation. For the formation of salts, there may be used, for example, alkaline agents such, for example, as alkali metal hydroxides or alkaline earth metal hydroxides, alkali metal carbonates or bicarbonates, or also organic bases, in particular tertiary nitrogen bases, provided the resulting salts are physiologically tolerable.

The invention, therefore, also provides a pharmaceutical preparation of the above kind, which comprises a compound of the general Formula 1 given above in admixture or conjunction with a pharmaceutically suitable carrier.

The pharmaceutical preparations are advantageously in the form of tablets and the pharmaceutically suitable carrier may be, for example, talc, starch, lactose, tragacanth or magnesium stearate.

A pharmaceutical preparation containing one of the aforesaid benzenesulfonyl-ureas as active substance, for example, a tablet or a powder, with or without the aforesaid carriers is advantageously brought into a suitable unit dosage form. The dose chosen should comply with the activity of the benzenesulfonyl-urea used and the desired effect. Advantageously, the dosage per unit amounts to about 0.5 to 100 milligrams, preferably 2 to 10 milligrams, but considerably higher or lower dosage units may also be used, which, if desired, are divided or multiplied prior to their administration.

The following examples illustrate the invention, but they are not intended to limit it thereto:

EXAMPLE 1

N-[4-($\beta$-<$\beta,\beta$-diphenyl-propionamido>-ethyl)-benzenesulfonyl]-N'-n-butyl-urea 20.4 grams of 4-($\beta$ - <$\beta,\beta$ - diphenyl - propionamido>-ethyl)-benzenesulfonamide (melting point 191–193° C.), 13.8 grams of finely pulverized potassium carbonate and 250 milliliters of acetone were heated, under reflux and while stirring, for 1 hour, until the acetone boiled. 5 grams of n-butyl-isocyanate were then added dropwise, while continuing boiling and stirring, and the whole was then stirred for 4 hours while further heating. The reaction solution was concentrated under reduced pressure, the residue obtained was dissolved in water, filtered and the filtrate was acidified with hydrochloric acid. The crystal magma obtained was filtered off with suction and recrystallized from methanol. The N-[4-($\beta$-<$\beta,\beta$-diphenyl-propionamido>-ethyl)-benzenesulfonyl] - N' - n-butyl-urea obtained was found to melt at 140–142° C.

In analogous manner there were obtained from the sulfonamide mentioned at the beginning and the corresponding isocyanates:

N-[4-($\beta$-<$\beta,\beta$-diphenyl-propionamido> - ethyl) - benzenesulfonyl] - N' - cyclohexyl - urea, melting point 190–192° C. (from methanol), N-[4-($\beta$-<$\beta,\beta$-diphenyl-propionamido> - ethyl) - benzenesulfonyl] - N' - (4-methyl - cyclohexyl)-urea (trans), melting point 184–186° C. (from methanol);

From 4-($\beta$-<$\beta,\beta$-bis-(4-chlorophenyl)-propionamido>-ethyl)-benzenesulfonamide, melting point 183–185° C.:

N-[4-($\beta$-<$\beta,\beta$-bis-(4 - chlorophenyl) - propionamido>-ethyl)-benzenesulfonyl] - N' - cyclohexyl - urea, melting point 168–170° C. (from methanol), N-[4-(β-<β,β-bis-(4 - chlorophenyl) - propionamido>-ethyl)-benzenesulfonyl]-N'-(4-methyl-cyclohexyl) - urea (trans), melting point 170–172° C. (from methanol);

From 4-(β-<β,β-bis-(4-chlorophenyl) - acrylamido>-ethyl)-benzenesulfonamide, melting point 181–183° C.:

N-[4-(β-<β,β-bis - (4 - chlorophenyl) - acrylamido>-ethyl)-benzenesulfonyl]-N'-cyclohexyl-urea, melting point 222–223° C. (from methanol/dimethylformamide), N-[4-(β-<β,β-bis - (4 - chlorophenyl) - acrylamido>-ethyl)-benzenesulfonyl]-N'-(4-methyl-cyclohexyl) - urea (trans), melting point 203–205° C. (from methanol/dimethylformamide);

From 4-(β<α,β-diphenyl-propionamido> - ethyl) - benzenesulfonamide (melting point 145° C.):

N-[4-(β-<α,β-diphenyl-propionamido> - ethyl) - benzenesulfonyl]-N'-cyclohexyl-urea, melting point 159–161° C. (from methanol), N-[4-(β-<α,β-diphenyl-propionamido> - ethyl) - benzenesulfonyl]-N'-butyl-urea, melting point 168–170° C. (from methanol), and N-[4-(β-<α,β-diphenyl-propionamido> - ethyl) - benzenesulfonyl]-N'-(4-methyl - cyclohexyl) - urea (trans), melting point 165–167° C. (from methanol);

From 4-(β-<α,β-diphenyl-acrylamido>-ethyl)-benzenesulfonamide (melting point 180–182° C.):

N-[4-(β-<α,β-diphenyl-acrylamido>-ethyl) - benzenesulfonyl]-N'-cyclohexyl urea, melting point 161–162° C. (from methanol), N-[4-(β-<α,β-diphenyl-acrylamido>-ethyl) - benzenesulfonyl]-N'-(4-methyl-cyclohexyl)-urea (trans), melting point 133–135° C. (from methanol);

From 4-(β-<α-phenyl-β-4-chlorophenyl - acrylamido>-ethyl)-benzenesulfonamide (melting point 185–187° C.:

N-[4-(β-<α-phenyl-β-4 - chlorophenyl - acrylamido>-ethyl)-benzenesulfonyl]-N'-cyclohexyl-urea, melting point 196–197° C. (from methanol).

EXAMPLE 2

N-[4-(β-<β,β-diphenyl-propionamido>-ethyl)-benzenesulfonyl]-N'-(2,5-endomethylene-cyclohexyl-methyl)urea (a) 1 gram of N-[4-(β-<β,β-diphenyl-propionamido>-ethyl)-benzenesulfonyl]-N'-(2,5 - endomethylene - cyclohexyl-methy)-thiourea (prepared by the reaction of 4-(β-<β,β - diphenyl - propionamido>-ethyl)-benzenesulfonamide and 2,5-endomethylene-cyclohexyl-isothiocyanate, melting point 162–164° C.) was dissolved in 100 milliliters of 1 N sodium hydroxide solution and 20 milliliters of 30% hydrogen peroxide were added. The whole was heated for 20 minutes on the steam bath, filtered, the filtrate was clarified with charcoal and, by acidifying the filtrate with hydrochloric acid, there was obtained N-[4-(β-<β,β - diphenyl - propionamido>-ethyl)-benzenesulfonyl]-N'-(2,5-endomethylene-cyclohexyl-methyl) - urea. The substance was found to melt after recrystallization from methanol at 191–192° C.

(b) 2.9 grams of N-[4-(β-<β,β-diphenyl-propionamido>-ethyl) - benzenesulfonyl] - N'-(2,5-endomethylene-cyclohexyl-methyl)-thiourea were suspended in 100 ml. of methanol. 0.1 gram of potassium carbonate and 1.1 gram of mercury oxide were added and the whole was stirred for 4 hours at 40° C.

The reaction solution was filtered and then concentrated. The residue obtained in the form of a tough resin constituting N-[4-(β-<β,β - diphenyl - propionamido>-ethyl)-benzenesulfonyl] - N' - (2,3-endomethylene-cyclohexyl-methyl)-isourea-methyl ether was heated with 250 milliliters of concentrated hydrochloric acid for 30 minutes on the steam bath, filtered with suction, washed with water and recrystallized from methanol. N-[4-(β-<β,β-diphenyl-propionamido> - ethyl) - benzenesulfonyl]-N'-(2,3- endomethylene - cyclohexyl - methyl)-urea, melting point 191–192° C., was obtained in a good yield.

EXAMPLE 3

N-[4-(β-<β,β-diphenyl-propionamido>-ethyl) - benzenesulfonyl] - N' - (2,5-endomethylene-Δ³-cyclohexenyl-methyl)-urea 14 grams of N-[4-(β-<β,β-diphenyl-propionamido>-ethyl)-benzenesulfonyl]-carbamic acid methyl ester (melting point 172–174° C.) were dissolved in 250 milliliters of dioxane. 3.7 grams of 2,5-endomethylene-Δ³-cyclohexenyl-methylamine were added while stirring and the whole was boiled for 5 hours under reflux. The solvent was then separated by distillation under reduced pressure and the residue was dissolved in 1 N sodium hydroxide solution. The solution was filtered, the filtrate was acidified with hydrochloric acid, whereupon N-[4-(β-<β,β-diphenyl - propionamido> - ethyl) - benzenesulfonyl]-N'-(2,5-endomethylene - Δ³ - cyclohexenyl-methyl)-urea was obtained. After recrystallization from methanol, the substance was found to melt at 194–196° C.

We claim:

1. A benzene-sulfonyl urea of the formula

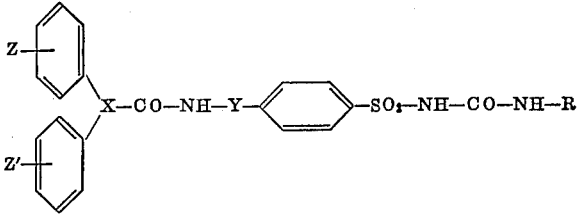

in which:

R represents (a) alkyl or alkenyl having 2 to 8 carbon atoms, (b) phenyl-lower alkyl, (c) cyclohexyl-lower alkyl, (d) endoalkylene-cyclohexyl, endoalkylene-cyclohexenyl, endoalkylene-cyclohexylmethyl or endoalkylene-cyclohexenylmethyl having 1 to 2 endoalkylene carbon atoms, (e) lower alkylcyclohexyl or lower alkoxycyclohexyl, (f) cycloalkyl having 5 to 8 carbon atoms, (g) cyclohexenyl or cyclohexenylmethyl, Z, Z' represent halogen, lower alkyl or lower alkoxy, X represents a saturated or unsaturated hydrocarbon radical having 2 carbon atoms, Y represents an alkyl chain having 1 to 3 carbon atoms, and physiologically tolerable salts thereof.

2. N-[4-(β-<β,β - diphenyl - propionamido>-ethyl)-benzenesulfonyl]N-n-butyl urea and physiologically tolerable salts thereof.

3. N-[4-(β-<β,β - diphenyl - propionamido>-ethyl)-benzenesulfonyl]-N'-cyclohexyl urea and physiologically tolerable salts thereof.

4. N-[4-(β-<β,β - diphenyl - propionamido>-ethyl)-benzenesulfonyl]-N'-(4-methyl-cyclohexyl) urea and physiologically tolerable salts thereof.

5. N-[4-(β-<β,β - diphenyl - propionamido>-ethyl)-benzene - sulfonyl]-N'-(2,5 - endomethylene-Δ³-cyclohexenyl-methyl) urea and physiologically tolerable salts thereof.

6. N-[4-(β - <α,β - diphenylpropionamido> - ethyl)-benzenesulfonyl] - N' - (4-methyl-cyclohexyl) urea and physiologically tolerable salts thereof.

7. N-[4-(β-<α,β - diphenylacrylamido> - ethyl) - benzenesulfonyl]-N'-(4-methyl-cyclohexyl) urea and physiologically tolerable salts thereof.

References Cited

German printed application (Auslegeschrift) No. 1,185,180, 11 pages, printed Jan. 14, 1965.

JOHN D. RANDOLPH, *Primary Examiner.*

U.S. Cl. X.R.

260—309.5, 470, 543, 544, 545, 552, 556, 999